United States Patent [19]

Mayhan

[11] Patent Number: 5,534,177
[45] Date of Patent: Jul. 9, 1996

[54] COMPOSITIONS USEFUL FOR REMOVING PRODUCTS OF METAL CORROSION

[76] Inventor: Kenneth G. Mayhan, 57 Lehigh Aisle, Irvine, Calif. 92715

[21] Appl. No.: 835,665

[22] Filed: Feb. 14, 1992

[51] Int. Cl.$^6$ .................................................. C02F 5/00
[52] U.S. Cl. ........................ 510/245; 510/274; 510/477; 510/434; 510/493; 510/501
[58] Field of Search .................................. 252/86, 87, 80, 252/181, 388, 387

[56] References Cited

U.S. PATENT DOCUMENTS

| | | | |
|---|---|---|---|
| 4,264,463 | 4/1981 | Kotake et al. | 252/82 |
| 4,541,945 | 9/1985 | Anderson et al. | 252/86 |
| 4,747,975 | 5/1988 | Ritter | 252/80 |
| 4,789,406 | 12/1988 | Holder et al. | 252/87 |
| 4,806,259 | 2/1989 | Amjad | 252/86 |
| 4,810,405 | 3/1989 | Waller et al. | 252/86 |
| 4,855,069 | 8/1989 | Schuppiser et al. | 252/87 |
| 4,970,015 | 11/1990 | Garcia | 252/79.2 |

*Primary Examiner*—Prince Willis, Jr.
*Assistant Examiner*—James M. Silbermann

[57] ABSTRACT

The present invention is directed to compositions useful for removing products of metal corrosion from corroded metals which consists essentially of an aqueous liquid solution of malonic acid, a surfactant and an organic solvent selected from the group consisting of formamide, dimethylformamide, and dimethylsulfoxide.

5 Claims, No Drawings

COMPOSITIONS USEFUL FOR REMOVING PRODUCTS OF METAL CORROSION

FIELD OF THE INVENTION

The present invention relates generally to compositions useful for removing products of metal corrosion from corroded metals. More particularly, the present invention relates to liquid and gel-like compositions which effectively and quickly remove rust from corroded metal surfaces at room temperature by simple immersion or coating methods.

BACKGROUND OF THE INVENTION

Metal corrosion is a tremendously costly problem which threatens the functional integrity of environmentally unstable materials. Corrosion in iron and iron mixed with chromium, nickel, etc. to form steels is particularly problematic because of their widespread use and importance in nearly every industry and the consumer market.

For iron and steels, corrosion consists of reactions between oxygen and water with metallic iron to form a host of oxides and hydrates including $FeO$, $Fe_2O_3$, $Fe_3O_4$, $FeO(OH)$, $Fe(OH)_3$, and others. These reactions are self-propagating oxidations which begin at the metal surface and proceed inward. The results are pits, spots and hairline patterns seen in the early stages of rusting. These changes in corroded metals result in larger structural problems including loss of strength, ductility, electrical and thermal conductivity, magnetism and visual characteristics such as gloss, color, reflectivity and refractivity.

During tile past decades, approaches to solving problems associated with corrosion included the development of a variety of metal surface treatments that help slow tile initiation and propagation of corrosion and the development of new alloys which are more resistant to oxidation. While, these developments have provided irons and steels with improved corrosion resistance, many of these are too costly to apply to lower-cost materials. Additionally, notwithstanding the advantages associated with these improvements, corrosion of metals, and particularly irons and steels, remains a problem.

Since the corrosion process is self-propagating, effectively removing the corrosion from metal surfaces aids in extending the useful life and improves the appearance of metals which are prone to oxidation. Thus, processes for efficiently removing the products of corrosion after they have formed are possible alternatives to using much more costly alloys and surface treatment processes. Unfortunately, the oxides and hydrates of iron are soluble in neither aqueous-based systems nor organicbased systems, complicating the problems associated with developing rust removal systems.

A number of rest removing products have been made available for consumer and industrial use. Most of these, however, require long-term exposure to the corroded metal at elevated temperatures or multiple applications over periods of hours. Moreover, typically these preparations are environmentally unsafe and are too toxic for consumer use. Additionally, the consistency of the products and their ability to adhere or wet to metal surfaces is poor. Moreover, when allowed to remain in contact with the atmosphere for very long time periods, the film formers in many of these products forms an adhesive bond with the rust or the base metal. These films are frequently very difficult to remove.

Accordingly, it is an objective of the present invention to provide a composition having superior rust removing characteristics and which is relatively non-toxic and environmentally safe.

It is additionally an objective of the present invention to provide a composition for removing rust from oxidized metals by simple coating or immersing techniques.

It is furthermore an objective of the present: invention to provide a composition which will remove rust without the need for multiple applications and elevated temperatures.

It is also an objective of the present invention to provide compositions which will lift rust from the corroded surfaces and then easily rinse from metal surfaces along with the rest.

SUMMARY OF THE INVENTION

The present invention achieves the above*described objectives and others by providing liquid compositions which, when applied to corroded metal surfaces using conventional coating or immersing techniques, will loosen and lift products of corrosion from the metal surface. Advantageously, the compositions of the present invention act quickly at ambient temperatures and without the need for multiple applications over lengthy time periods. Moreover, the compositions described herein will cleanly rinse from the metal surface and carry the removed rust: in the rinse.

The present invention is based upon the unexpected discovery that liquid solutions of malonic acid will cleanly lift rest from the surface of iron-containing metals. Preferred exemplary compositions include aqueous solutions of at least about 10 w/v % malonic acid; however, malonic acid concentrations as low as 1 w/v % have rust removal abilities. In addition to aqueous solutions of malonic acid, the compositions of the present invention further include organic solvent solutions of malonic acid, and combinations of organic solvent and water solutions of malonic acid. Depending upon the specific application, either aqueous, organic, or combined organic and aqueous liquid solutions of malonic acid are effective for removing rust from metal objects using immersion techniques. Organic solvents having utility in the practice of the present invention include water-soluble solvents having low vapor pressures; for example, formamide. Such solvents aid in extending the liquid life of the liquid malonic acid solution by reducing the rate of solvent evaporation.

Liquid solutions of malonic acid which further include surfactant have improved abilities to wet and adhere to metal surfaces and thus exhibit more efficient rust removal characteristics. Similarly, liquid solutions of malonic acid which further include gel-forming additives or thixotropic agents have improved retention characteristics. In accordance with the present invention, compositions incorporating these gel-forming additives or thixotropic agents will remain coated on vertical surfaces due to their increased resistance to flow.

It has also been discovered that by incorporating certain organic compounds into liquid solutions of malonic acid, the ability of the solutions to lift rust from the surface is enhanced. More specifically, the presence of organic acids, and in particular maleic acid, appears to be beneficial.

It is also contemplated to be within the scope of the present invention to further include anticorrosion treatment agents in the rust removing compositions. For example, phosphate anticorrosion agents including orthophosphate, polyphosphates, phosphoric acid and phosphonates provide the compositions of the present invention with some ability to retard corrosion of the metal subsequent to removing the compositions.

Processes for utilizing the compositions of the present invention to lift rust from corroded metal include simply causing liquid solutions of malonic acid to contact corroded metal parts and then removing the solution of malonic acid and lifted rust. Techniques for causing the compositions to contact corroded metal parts include immersion, painting, spraying and dipping the corroded metal parts. Typically, removing the solution of malonic acid and rust is accomplished by simply rinsing the surface with a stream of water.

Further objects, features and advantages of the corrosion removal compositions of the present invention, as well as a better understanding thereof, will be afforded to those skilled in the art from a consideration of the following detailed explanation of preferred exemplary embodiments.

DETAILED DESCRIPTION OF PREFERRED EMBODIMENTS

The compositions of the present invention are suitable for use in procedures for removing metal corrosion products from corroded metals. As described with more detail below, the compositions of the present invention are particularly useful for removing iron oxides and hydrates from the surface of iron-containing metals, including steels. Thus, the practice of the present invention provides a wide range of benefits to industries and individuals plagued with constant or intermittent problems related to corroded iron and iron-containing metals. Moreover, the compositions of the present invention are relatively inexpensive, safe to prepare and use and environmentally nontoxic, making them easily accessible to retail consumers.

The present invention is based upon the discovery that liquid solutions of malonic acid will remove rust when applied to corroded metal. Thus, in its broadest aspect, the present invention provides liquid solutions of a corrosion removal effective concentration of malonic acid. Corrosion removal effective concentrations of malonic acid can range from as little as 1 w/v % to as high as 50 w/v % malonic acid. Exemplary embodiments more typically include aqueous solutions of from about 5 w/v % to about 10 w/v % malonic acid. For most rust removal applications, the corrosion removal effectiveness improves with increasing malonic acid concentration, up to a concentration of about 10 w/v %. Aqueous solutions having concentrations of malonic acid which exceed about 10 w/v % do not show significant improvement in rust removal capabilities. Thus, the preferred corrosion removal effective concentration of malonic acid is about 10 w/v %.

Malonic acid is a three carbon dicarboxylic acid, or propanedioc acid. The acid is widely available commercially from any of a large number of secondary and primary chemical suppliers. Malonic acid is a solid at ambient temperatures and very water soluble, which is convenient for producing concentrated aqueous solutions. The mechanism associated with the unexpected and surprisingly superior rust removal properties of aqueous solutions of malonic acid are not fully understood. Malonic acid solutions are much more effective in removing rust than solutions of other alkyl and aromatic mono and di-carboxylic acids, including fumaric, oxalic, succinic, adipic and oleic acids. For this reason, it is thought that the steric arrangement of the two acid functionalities of malonic acid is uniquely suited for complexing or chelating iron oxides and hydrates, the rust or iron containing metal corrosion products. Conversely, other diacids would not easily form chelated complexes with these oxides because the resulting structures would be too strained.

Even though simple aqueous solutions of malonic acid or organic solvent solution of malonic acid are effective in removing rust from metal surfaces, exemplary embodiments of the present invention preferrably include certain additives for enhancing certain solution properties. For example, the liquid solutions of malonic acid which additionally include a surfactant have improved surface wetting characteristics. That is, the compositions adhere to surfaces as opposed to forming beads upon contact with the surface. The increased wetability allows the rust-removing compositions to form a more intimate contact for interacting with metal surfaces.

Suitable surfactants include both ionic and nonionic surfactants which form chemically stable and miscible systems with the liquid malonic acid solutions. Nonionic surfactants tend to remain in solution and do not interact with malonic acid. For this reason, nonionic surfactants are generally preferred. Those skilled in the art will appreciate that nonionic surfactants are widely available in almost limitless form. For this reason, an exhaustive listing of surfactants is not possible. Some of the more common suitable surfactants include salts of fatty acids, alkyl benzenes, carboxylated alcohol and soaps, alkyl phenols, polyoxypropylenes, fluorocarbons and silicone surfactants, sulphate esters, fatty alcohol sulfates, sulfated fatty acid condensation products, sulfated ethers, sulfated fats and oils, aliphatic sulfonates, alkylaryl sulfonates, alpha-sulfocarboxylic acids, sulfo and amide suffactants, phosphoric acid esters and heterocyclic cationic derivatives. In specific cases, mixtures of surfactants have been found useful to improve wetting and to act as bacteriacides.

Effective concentrations of suffactant are those which maximize the weltability of the malonic acid solutions and are dependent upon the specific surfactant selected. While concentrations of less than 1 w/v % contribute to the weltability of the compositions of the present invention, preferred exemplary embodiments have at least 1 w/v % and up to about 2 w/v %.

Aqueous solutions of malonic acid are relatively free flowing with low water-like viscosities. As will be discussed below, for purposes of removing rust on metal surfaces, such solutions are advantageous when immersion methods are utilized for causing the malonic acid solutions to contact metal surfaces. These solutions are also generally suitable when techniques such as spraying are utilized on surfaces which are horizontal and easily retain the solutions. For applications in which improved retention properties are preferred, such as in removing rust by applying malonic acid solutions to vertical surf-aces, it is preferable to further include additives such as thickeners or thixotropic agents. These additives alter the flow properties of the malonic acid solutions making them more resistant to flow. Thus, malonic acid solutions which incorporate these additives do not readily flow from vertical faces and, once applied to surfaces, will remain in place for an extended length of time. A preferred thixotropic agent is fumed silica. When incorporated in solutions of malonic acid at levels ranging from about 2 w/v % to about 10 w/v %, the resulting rust-removing compositions exhibit significantly increased resistance to flow. Preferred exemplary embodiments of the present invention include fumed silica at a concentration of about 8 w/v %.

Additional additives associated with increasing the ability of malonic acid solutions to cling to vertical surfaces include film-forming and gel-forming polymers. The presence of film-forming polymers in the malonic acid solutions both increases the viscosity of the solution and causes a "skin" to form on surfaces to which the solutions are applied. This "skin" can lock the malonic acid solution adjacent to the rust surfaces for a length of time sufficient to lift the rust from the surfaces. When gel-forming polymers are included in the composition of the present invention, the effect is similar. Preferrably, the above-described polymers are water soluble and do not adversely interact with malonic acid. In the event that organic solvents, as discussed below, are also included in the malonic acid solutions, these film-forming and gel-forming polymers should be soluble in the combination of organic solvent and water. Suitable polymers include polyacrylamide, polyvinylpyrolidone, polysaccharides, substituted celluloses, polyvinylalcohol, polyethylene oxides, as well as anionic and cation aqueous dispersions of non-water-soluble polymers.

While liquid solutions of malonic acid are preferably aqueous solutions, in accordance with the present invention, it is also contemplated to be within the present invention to provide organic solvent solutions of malonic acid, as well as mixtures of aqueous and organic solvent solutions of malonic acid. In any case, the presence of water in the liquid solutions is preferred because the water appears to enhance the rustremoval capabilities of malonic acid. Additionally, the presence of certain organic solvents appears to aid the rust-removal capabilities of aqueous malonic acid solutions. Suitable organic acids should be water soluble and have a relatively low vapor pressure. This particular combination provides a water-miscible system which does not quickly evaporate from surfaces to which it is applied. Thus, the malonic acid remains in solution longer where it more freely interacts with corrosion products. Suitable solvents include dimethylsulfoxide, dimethylformamide, diethylformamide and formamide, at preferred concentrations of from about 5 w/v % to about 20 w/v %. Those skilled in the art, however, will appreciate that this list is non-limiting and that any number of a large variety of organic solvents may be incorporated into malonic acid solutions for the purpose of increasing the residence time of the solution and enhancing the rust removal effectiveness.

Furthermore, and in accordance with the present invention, malonic acid solutions which further include maleic acid at concentrations of between about 1 w/v % and 10 w/v % appear to more effectively remove some types of rust from corroded metal surfaces. As mentioned above, solutions of malonic acid exhibit surpisingly superior rust removal properties which are not apparent in similar organic acids. Thus, it is speculated that its molecular size and the steric arrangement of the acid groups contribute to malonic acid's superior performance. Preliminary studies indicate that malonic acid solutions appear to actually "lift" rust from corroded metal surfaces. Moreover, malonic acid may have a preference for "lifting" $Fe_2O_3$ over other iron oxide and iron hydrate states. This observation may explain the apparent synergistic effect of combinations of malonic acid and maleic acid, or malonic acid and butenedioic acid. Maleic acid is similar in size (differing by one carbon atom with a shorter unsaturated bond) and, in the presence of some types of iron oxides, may act as a chelator for "lifting" rust from metal surfaces.

Other useful additives having utility in the malonic acid solutions of the present invention include anticorrosion treatment agents such as phosphates, including but not limited to orthophosphates, polyphosphates, phosphonates and phorphoric acid. Their presence in the compositions of the present invention are thought to contribute to retarding the corrosion process of metal surfaces after their corrosion products have been removed.

The liquid solutions of the present invention can be prepared using conventional solution processing techniques. Since malonic acid has a high solubility in water, simply adding the two components and mixing is sufficient. Similarly, when surfactants, organic acids, phosphoric acid and organic solvents are included in the liquid solutions of malonic acid, each of these components can be simply mixed. Precautionary techniques should be used when adding concentrated phosphoric acid to the liquid solutions of malonic acid. When thixotropic agents, such as fumed silica, are utilized in the compositions, it is preferable to graudally add small increments of the fumed silica and stir well under shear before adding another increment. This technique aids in avoiding the formation of fumed silica aggregates.

Processes for utilizing the compositions of the present invention for removing corrosion products from corroded metals include the steps of providing a liquid solution of malonic acid and causing the liquid solution of malonic acid to contact the corroded metals. As described in detail above, the liquid solution of malonic acid is preferably an aqueous solution of at least about 10 w/v % malonic acid. Depending upon the nature of the corroded metals and the selected method for causing the malonic acid solution to contact the corroded metals, preferred embodiments can further include from about 1 v/v% to about 2 v/v% surfactant, from about 2 w/v % to about 10 w/v % thixotropic agent such as fumed silica, from about 5 v/v% formamide, from about 5 w/v % maleic acid, and about 10 v/v% (85%) phosphoric acid.

Causing the liquid solution of malonic acid to contact the corroded metals is accomplished by using any of a variety of techniques. As mentioned above, the preferred method depends upon the nature of the corroded metals. For vertical surfaces, painting with the malonic acid solution, which preferably further includes a thixotropic agent, is preferred. Other techniques include immersing corroded metal parts, wiping corroded metal parts, dipping corroded metal parts, and spraying corroded metal parts.

Typically, to remove light rest and corrosion products, the malonic acid solution is allowed to contact the corroded metals for a period of time ranging from a few minutes to about one hour. The "lifting" process takes place at ambient temperatures and does not require physical action such as abrasion or high pressure spraying. For heavier rusts, the malonic acid solution should contact the corroded metal for a period of more than one hour. In cases of extremely heavy rusting and corrosion, longer periods of time may be necessary.

Subsequent to causing the malonic acid solution to contact the corroded metal, the malonic acid solution and the "lifted" rust can be removed by quickly rinsing the metal with water. If film-forming polymers or gel films have formed, the rinsing step may require more than one application of water. Typically, however, removing the films or gel compositions does not require mechanical actions beyond the force of a stream of water; and after the rust-removal composition and the "lifted" rust are removed, the metal surface has a visually clean appearance.

The following examples are offered as being illustrative of the principles and embodiments of the present invention and not by way of limitation.

EXAMPLE 1

The following tests were carried out to determine the relative rust-removal characteristics of a series of organic acids in combination with selected organic solvents and water. Solutions of each acid in the indicated solvent or solvent system were prepared by dissolving the acid in the solvent at a concentration of 10 w/v %. Then separate rusted steel panels were immersed in each of the acid solutions for a period of 24 hours and visual observations were made as a function of time. Table I illustrates the acids and solvents used and their relative abilities to remove rest from the immersed steel panels.

steel panels were coated with each mixture, one panel in a vertical position and a second panel in a horizontal position. Comparable results obtained for each panel. Table II shows the results for comparison to the results obtained for free-flowing solutions illustrated in Table I.

TABLE I

| ORGANIC ACID | SOLVENT | | | | |
|---|---|---|---|---|---|
| | DMSO | DMSO + $H_2O$ | FORMAMIDE | FORMAMIDE + $H_2O$ | DMF + $H_2O$ |
| Methane Sulfonic | 1 | 1 | 2 | 3 | 2 |
| Benzene Sulfonic | 1 | 1 | 1 | 1 | 1 |
| P-toluene Sulfonic | 2 | 1 | 5 | 2 | |
| Chloro Acetic | 5 | 5 | 4 | 5 | |
| Oxalic | 4 | 5 | 1 | 3 | 4 |
| Malonic | 3–4 | 1 | 1 | 1 | 3 |
| Succinic | 5 | 5 | 5 | 5 | |
| Adipic | 5 | 5 | 5 | 5 | |
| Maleic | 3 | 3 | 1 | 1 | 1 |
| Fumaric | 5 | 5 | 5 | 5 | |
| Oleic | 5 | 5 | 5 | 5 | |
| Itaconic | 5 | 5 | 5 | 5 | |
| Malic | 5 | 5 | 1 | 1 | 5 |
| Tartaric | 5 | 3 | 5 | 1 | |
| Lactic | 3 | 5 | 1 | 5 | |

1 = 80%–100% of the rust removed
5 = 0%–20% of the rust removed
DMSO = dimethylsulfoxide
DMF = dimethylformamide Note that the sulfonic acids are generally effective. However, these acids additionally contribute to corrosion. It is clear that combinations of water and organic solvents are effective for rust removal when used with malonic acid.

The ineffectiveness of fumaric, oxalic, succinic, adipic and oleic acids can be explained on the basis that possible chelates of these acids would have a strained structure, making their existence improbable.

EXAMPLE 2

The rust removal effectiveness of various concentrations of malonic acid and maleic acid in solution was evaluated by preparing a series of malonic acid solutions and maleic acid solutions varying in concentration from 1.25 w/v % to 10 w/v %. Dimethylsulfoxide, formamide, dimethylformamide were all tested as solvents and each of the solutions were evaluated using the same technique described above in Example 1. Results indicated that, generally, acid concentrations below about 5 w/v % were less effective than those above 5 w/v % and acid concentration above 5 w/v % showed a small increase in effectiveness up to about 10 w/v %.

EXAMPLE 3

In order to evaluate the effects of altering the flow properties of malonic acid solutions and maleic acid solutions on their ability to remove rust from corroded steel panels, separate solutions of malonic acid and maleic acid in DMSO, formamide and dimethylformamide were prepared as described in Example 1. Then fumed silica (Cabosil, available from Cabot Corporation) was added to each sample until a paste consistency was obtained. Then two

TABLE II

| ORGANIC ACID | SOLVENT | | |
|---|---|---|---|
| | DMSO | FORMAMIDE | DMF |
| Malonic Acid | 1 | 1 | 1–2 |
| Oxalic Acid | 3 | 4 | 2 |
| Maleic Acid | 1 | 1 | 1–2 |
| Malic Acid | 1–2 | 1 | 2 |
| Lactic Acid | 2 | 4 | 5 |

1 = 80%–100% of the rust removed
5 = 0%–20% of the rust removed

EXAMPLE 4

A series of aqueous solutions having malonic acid concentrations of about 10 w/v % and additionally including a variety of additives such as thixotropic agents, film forming polymers, maleic acid, nonionic ethoxylated alcohol surfactants, and phosphoric acid were prepared and evaluated for their effectiveness in removing rust from rusted steel panels placed in a vertical position. The following details the formulations tested and their relative effectiveness.

| SAMPLE 1 | | RESULTS |
|---|---|---|
| Malonic Acid | 10 g | Fair rust removal after 1 hour. |
| DI $H_2O$ | 80 mL | |
| $H_3PO_4$ (85%) | 10 mL | |
| Micro | 0.5 mL | |
| Klucel | 2 g | |

(Micro—surfactant available from Baxter Scientific Products)
(Klucel—soluble cellulose available from Hercules)

| SAMPLE 2 | | RESULTS |
|---|---|---|
| Malonic Acid | 10 g | Does not wet well enough. |
| DI $H_2O$ | 80 mL | Poor rust removal. |
| $H_3PO_4$ (85%) | 10 mL | |
| Micro | 0.5 mL | |
| Polyvinylpyrrolidone | 2 g | |

(Polyvinylpyrrolidone—available from GAF Corporation)

| SAMPLE 3 | | RESULTS |
|---|---|---|
| Malonic Acid | 10 g | Does not wet well enough. |
| DI $H_2O$ | 80 mL | Poor rust removal. |
| $H_3PO_4$ (85%) | 10 mL | |
| Micro | 0.5 mL | |
| Polyvinylalcohol | 2 g | |

(Polyvinylalcohol—available from Air Products & Chemicals, Inc.

| SAMPLE 4 | | RESULTS |
|---|---|---|
| Malonic Acid | 10 g | Excellent film forming and |
| DI $H_2O$ | 80 mL | rust removal properties. |
| $H_3PO_4$ (85%) | 10 mL | |
| Micro | 0.5 mL | |
| Polyacrylamide | 2 g | |

(Polyacrylamide—$5 \times 10^6$ molecular weight)

| SAMPLE 5 | | RESULTS |
|---|---|---|
| Malonic Acid | 10 g | Excellent wettability and retention. |
| DI $H_2O$ | 80 mL | Removes rust within 1 hour. |
| $H_3PO_4$ (85%) | 10 mL | |
| Micro | 0.5 mL | |
| Aerosil-200 | 2 g | |

(Aerosil-200—fumed silica having a BET surface area of about 200 $m^2/g$)
(Aerosil-200—available from Degussa Corporation)

| SAMPLE 6 | | RESULTS |
|---|---|---|
| Malonic Acid | 10 g | Excellent retention properties. |
| DI $H_2O$ | 97.5 mL | Removes rust within 1 hour. |
| $H_3PO_4$ (85%) | 10 mL | |
| Micro | 0.5 mL | |
| Klucel | 2.5 g | |
| Cabosil | 3 g | |

(Cabosil—hydrophobic fumed silica, available from Cabot Corporation)

| SAMPLE 7 | | RESULTS |
|---|---|---|
| Malonic Acid | 10 g | Good retention. |
| DI $H_2O$ | 100 mL | Good rust removal properties. |
| Micro | 1 mL | |
| Maleic Acid | 5 g | |
| Aerosil-200 | 8 g | |

| SAMPLE 8 | | RESULTS |
|---|---|---|
| Malonic Acid | 10 g | Good retention. |
| DI $H_2O$ | 80 mL | Good rust removal properties. |
| Dimethylformamide | 20 mL | |
| Micro | 1 mL | |
| Maleic Acid | 5 g | |
| Aerosil-200 | 8 g | |

| SAMPLE 9 | | RESULTS |
|---|---|---|
| Malonic Acid | 10 g | Good retention. |
| DI $H_2O$ | 100 mL | Good rust removal properties. |
| Micro | 1 mL | |
| Aerosil-200 | 8 g | |
| 2-Chloroethylamine Monohydrate Hydrochloride | 0.5 g | |

| SAMPLE 10 | | RESULTS |
|---|---|---|
| Malonic Acid | 10 g | Removes rust on a vertical |
| DI $H_2O$ | 100 mL | panel within 30 minutes. |
| Micro | 1 mL | |
| Aerosil-200 | 9 g | |
| $H_3PO_4$ (85%) | 5 mL | |
| 2-chloroethylamine monohydrate hydrochloride | 0.5 g | |

In closing, it should be understood that the embodiments of the present invention disclosed herein are illustrative of the principles of the present invention and that other modifications may be employed which are within the scope thereof. For example, even though the compositions of the present invention are described in terms of malonic acid solutions (which optionally contain gel-forming or film-forming additives), it is also contemplated that emulsions or microemulsions of malonic acid are within the scope of the present invention. Accordingly, the present invention is not limited to that precisely as disclosed and described and is limited only by the appended claims.

I claim:

1. A composition useful for removing products of metal corrosion from corroded metals, said composition comprising:

an aqueous solution of a corrosion removal effective concentration of malonic acid and an organic solvent said organic solvent selected from the group consisting of formamide, dimethylformamide, and dimethylsulfoxide.

2. The composition of claim 1 further including a thixotropic agent.

3. The composition of claim 1 further including a surfactant.

4. A composition useful for removing products of metal corrosion from corroded metals, said composition consisting essentially of:

an aqueous liquid solution of a corrosion removal effective concentration of malonic acid, a surfactant and an organic solvent selected from the group consisting of formamide, dimethylformamide, and dimethylsulfoxide.

5. The composition of claim 4 wherein said aqueous solution further includes less than about 10 v/v% (85%) phosphoric acid.

* * * * *